United States Patent [19]

Baxter

[11] Patent Number: 5,102,548
[45] Date of Patent: Apr. 7, 1992

[54] SEPTAGE PRETREATMENT AND TREATMENT BATCH PROCESSING

[75] Inventor: Richard C. Baxter, Moline, Mich.

[73] Assignee: Richard C. Baxter, Moline, Mich.

[21] Appl. No.: 465,037

[22] Filed: Jan. 16, 1990

[51] Int. Cl.$^5$ ............................................... C02F 3/02
[52] U.S. Cl. .................................................... 210/621
[58] Field of Search ............... 210/622, 625, 620, 621, 210/623, 624, 629

[56] References Cited

U.S. PATENT DOCUMENTS

| | | |
|---|---|---|
| 2,457,057 | 12/1948 | Mallory ............................. 210/625 |
| 3,386,911 | 6/1968 | Albertson ........................... 210/625 |
| 3,409,545 | 11/1968 | Albertson ........................... 210/625 |
| 3,730,881 | 5/1973 | Armstrong .......................... 210/625 |
| 4,915,840 | 4/1990 | Rozich ............................... 210/625 |

Primary Examiner—Thomas Wyse
Attorney, Agent, or Firm—Price, Heneveld, Cooper, DeWitt & Litton

[57] ABSTRACT

A sequencing batch waste treatment facility with pretreatment mixing, blending and dilution and post-treatment recirculation wherein high biological oxygen demand (BOD) waste is treated and reduced to a BOD acceptable by the prevalent secondary, municipal-type waste treatment facility.

1 Claim, 1 Drawing Sheet

SEPTAGE PRETREATMENT AND TREATMENT BATCH PROCESSING

BACKGROUND OF THE INVENTION

The present invention generally relates to sewage treatment and specifically to septage, holding tank waste and landfill leachate treatment which cannot be accommodated by typical municipal-type waste treatment facilities.

The Environmental Protection Agency (EPA) and state governments dictate the discharge standards for municipal-type waste treatment facilities. A standard unit of measure is the biological oxygen demand loading concentration (BOD) given in parts per million (ppm). For example, the BOD for the prevalent secondary municipal-type waste treatment facility discharge is 20 to 30 ppm in Michigan. This mandates a BOD less than 250 ppm in the sanitary sewer supplying the municipal-type waste treatment facility in order to avoid overloading and shocking the treatment facility system.

Waste treatment facilities are designed to accommodate specified volumes of waste at a specified BOD. The mandated BOD maximum of 250 ppm will typically accommodate a residential sanitary sewer at volumes which do not exceed the design capacity of the municipal-type waste treatment facility. However, municipal-type waste treatment facilities are pushed to their capabilities as communities grow. Further, the municipal-type waste treatment facility cannot practically accommodate sources of high concentration waste. These sources of high concentration waste include landfill leachate, septage and holding tank waste.

Leachate and septage are too concentrated for typical municipal-type waste treatment facility processing. Leachate typically has a BOD of about 5,000 ppm. Septage typically has a BOD of about 3,500 ppm. Holding tank waste presents a different problem of excessive amounts of solid waste, typically up to 40%. A common method of disposal for these high concentration wastes is to simply spread the waste over an open field or farm field. This presents other problems. First, nitrates, common in this waste, quickly filter through the ground, settling into the ground water and presenting a potential ground water pollution problem. Second, even if buried or cultivated into the soil through normal farming activity, solid wastes have a tendency to float up through and surface above the ground. Finally, monitoring and regulating the disposal of heavy metal and toxic wastes is quite difficult with significant ground and water pollution problems resulting.

SUMMARY OF THE INVENTION

The aforementioned problems are addressed and effectively resolved by the present invention which presents a modular approach to process high BOD wastes. Rather than merely discarding high BOD waste across the land or burying it underground, the waste treatment facility of the present invention processes and treats high BOD waste for acceptance by a municipal-type waste treatment facility or after complete treatment to discharge the output without further treatment by a municipal facility.

The waste treatment facility of the present invention includes a reservoir for receiving and pretreating high BOD waste. The pretreated waste is transferred to a second reservoir for a bacteria-activated treatment. Low BOD liquid effluent is decanted off of the second reservoir and either recycled back to the pretreatment reservoir or discharged from the facility. Waste sludge is transferred from the second reservoir to a third reservoir for a bacteria-activated digestion treatment. Liquid effluent is decanted off of the third reservoir and transferred to the second reservoir. Stabilized sludge is discharged from the sludge digester for proper sludge disposal.

DESCRIPTION OF THE PREFERRED EMBODIMENT

Figure 1:
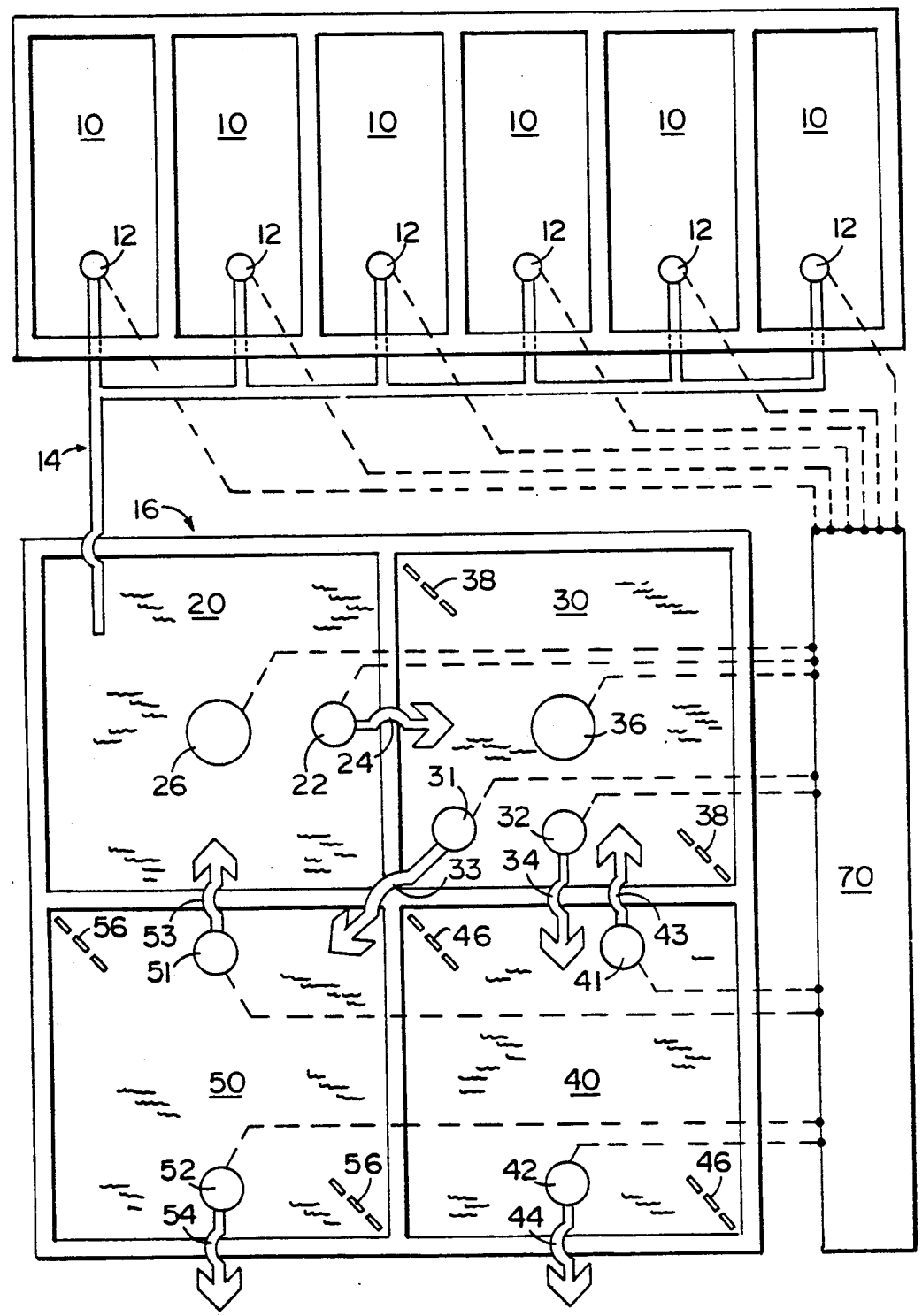
FIG. 1 shows a schematic representation of the waste treatment facility of the present invention.

With reference to FIG. 1, the preferred embodiment of the waste treatment facility of the present invention includes typical receiving and holding tanks 10. High BOD waste is received by a holding tank 10 from a waste hauler. The waste is analyzed and proper treatment is determined. Source information, treatment requirements and disposition for each batch of waste received is entered into a control system 70. If the batch contains non-treatable toxic waste, the batch will be rejected and disposed of via proper toxic waste disposal (not shown). Typically, the batch will be received and pumped via a pump 12 through piping 14 into a mix and blend cell 20. The batch will be mixed and blended in cell 20 by a floating mixer 26. Liquid effluent can be pumped from a clarifier cell 50 via a pump 51 through piping 53 into cell 20 to dilute the batch as required. Further, the batch can be chemically treated in cell 20 as required. After the batch is sufficiently pretreated in cell 20, it is pumped to a bio-mass cell 30 via a pump 22 and through piping 24. A bacteria-activated decomposition of the batch occurs in cell 30, aided by air bubble diffusers, preferably coarse air bubble diffusers, 38 and a floating mixer 36. After treatment in cell 30, liquid effluent is decanted via a pump 31 and through piping 33 into cell 50 and sludge is pumped via a pump 32 through piping 34 into a sludge digester cell 40. A bacteria-activated sludge digesting process including coarse air bubble diffusers 46 occurs in cell 40. Liquid effluent separated in this process is decanted back to cell 30 via a pump 41 and through piping 43. Stabilized sludge is discharged from cell 40 via a pump 42 and through piping 44 for proper sludge disposal (not shown). The liquid effluent held in cell 50 is now of sufficiently low BOD to be received by a municipal-type waste treatment facility. Extended treatment in cell 30 can lower the effluent BOD to satisfy National Discharge Pollution Elimination System (NDPES) permit standards for general effluent discharge. Fine air bubble diffusers 56 are used to maintain or enhance this condition. Some effluent from cell 50 is recycled back to cell 20 via pump 51 and piping 53 as subsequent batches require dilution. Other effluent held in cell 50 is discharged from the waste treatment facility via a pump 52 and piping 54. This discharge can take place during off peak usage time periods for a receiving municipal-type waste treatment facility or as a NDPES permit specifies for general discharge.

The waste treatment facility of the present invention is preferably equipped with a ducting system whereby fumes and odors normally associated with the waste treatment are captured and filtered. Because of the modular nature of the waste treatment facility of the present invention, its capacity is easily expanded by the addition of cells to increase the bio-mass and sludge digester capacity (cells 30 and 40, respectively). Further, as the cell walls 16 are not penetrated by any piping (14, 24, 33, 34, 43, 44, 53 and 54), the cell functions and associated piping are easily rearranged to accommodate future changes or expansions.

The above description is considered that of the preferred embodiment only. Modifications of the invention will occur to those who make or use the invention. Therefore, it is understood that the embodiment shown in the drawing and described above is merely for illustrative purposes and is not intended to limit the scope of the invention, which is defined by the following claims as interpreted according to the principles of patent law, including the doctrine of equivalents.

The embodiments of the invention in which an exclusive property or privilege is claimed are defined as follows.

1. A method of treating high biological oxygen demand waste (BOD) for acceptance by a municipal type waste treatment facility or for general discharge per National Discharge Pollution Elimination System permit specifications, comprising the following steps:

receiving high BOD waste in a pretreating receptacle;

pretreating the waste by blending solid and liquid components of the waste together and by diluting the blended waste with treated effluent;

moving the entirety of the pretreated waste from said pretreating receptacle to a treatment receptacle without separating solids from the pretreated waste;

treating the entirety of the pretreated waste in said treatment receptacle by mixing, oxygenation and bacteriological decomposition;

collecting liquid effluent from said treatment receptacle in a liquid effluent collection receptacle;

moving waste sludge from said treatment receptacle to a sludge digesting receptacle;

digesting waste sludge in said sludge digesting receptacle by oxygenation and bacteriological decomposition;

moving liquid effluent from said digesting receptacle to said treatment receptacle;

discharging stabilized sludge from said digesting receptacle;

moving liquid effluent from said liquid effluent collection receptacle to said pretreating receptacle;

discharging liquid effluent from said liquid effluent collection receptacle; and monitoring and controlling the pretreatment, treatment, digestion and movement of waste, liquid effluent and sludge.

* * * * *